United States Patent [19]

Lender

[11] 4,118,686
[45] Oct. 3, 1978

[54] ERROR CORRECTION FOR SIGNALS EMPLOYING THE MODIFIED DUOBINARY CODE

[75] Inventor: Adam Lender, Palo Alto, Calif.

[73] Assignee: GTE Automatic Electric Laboratories, Incorporated, Northlake, Ill.

[21] Appl. No.: 830,954

[22] Filed: Sep. 6, 1977

[51] Int. Cl.² .............................................. G08C 25/00
[52] U.S. Cl. .............................. 340/146.1 AB; 325/41
[58] Field of Search .............. 340/146.1 AB, 146.1 R; 325/38 A, 38 R, 41

[56] References Cited

U.S. PATENT DOCUMENTS

| | | | |
|---|---|---|---|
| 3,303,462 | 2/1967 | Dotter, Jr. ............... | 340/146.1 AB |
| 3,337,864 | 8/1967 | Lender ..................... | 340/146.1 AB |
| 3,343,125 | 9/1967 | Lender ..................... | 340/146.1 AB |
| 3,461,426 | 8/1969 | Lender ..................... | 340/146.1 AB |

OTHER PUBLICATIONS

Mesiya et al., Maximum Likelihood Sequence Estimation of Binary Sequences, etc., IEEE Transactions on Communications, vol. Com 25, No. 7, Jul. 1977.

*Primary Examiner*—Charles E. Atkinson
*Attorney, Agent, or Firm*—Leonard R. Cool

[57] ABSTRACT

Single errors can be detected and corrected in a signal employing a 3-level modified duobinary code. Error correction is predicated on the concept of maximum likelihood of error for the bit having the maximum departure from normal amplitude (error differential). A converter accepts the modified duobinary signal, decodes the signal to obtain a binary output signal and determines the error differential for each bit. Bits of the binary output signals are temporarily stored in a sequential storage device. The error differential is applied to an input of an error analyzer. An error detector determines if an error has occurred during an error correction interval which interval is established by successive extreme levels of the modified duobinary signal. The error analyzer tracks the location of the bit having the largest error differential during each error correction interval. A plurality of bit correctors, one for each time slot of the sequential storage device, operate in combination with the error detector and the error analyzer to alter the bit having the highest error differential following detection of an error.

18 Claims, 16 Drawing Figures

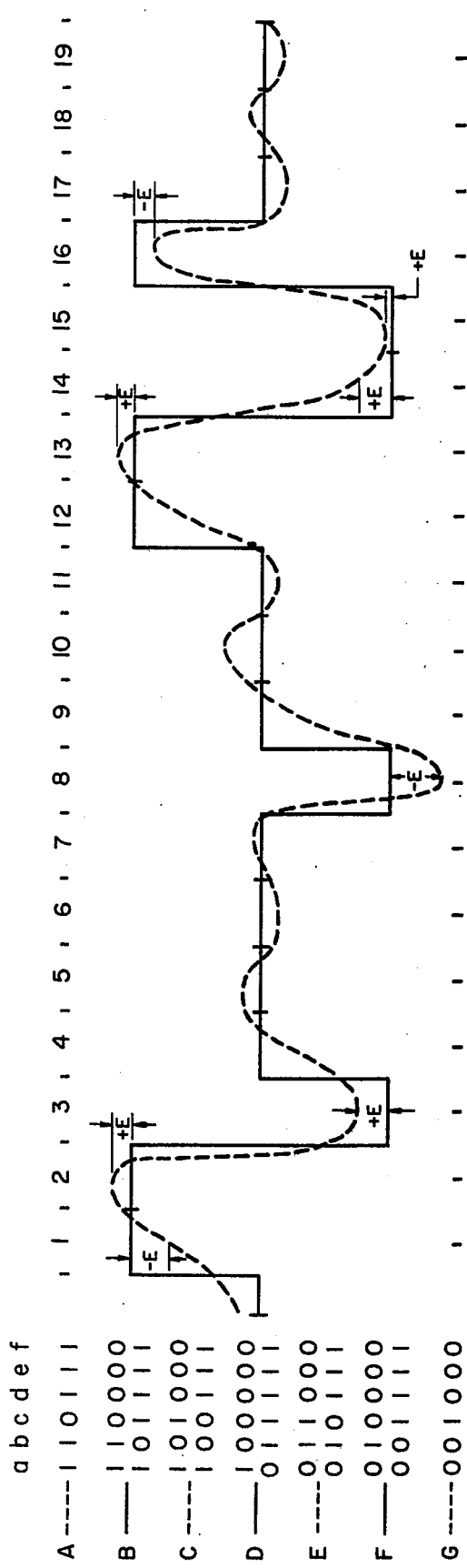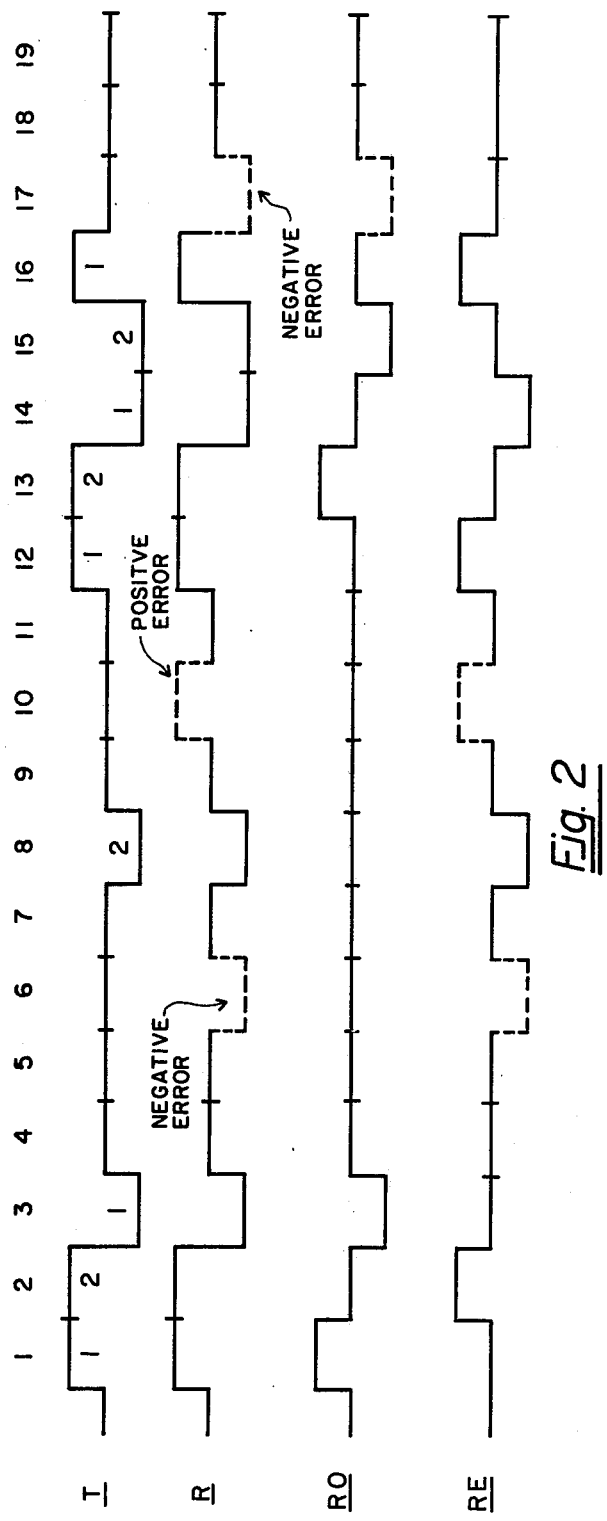

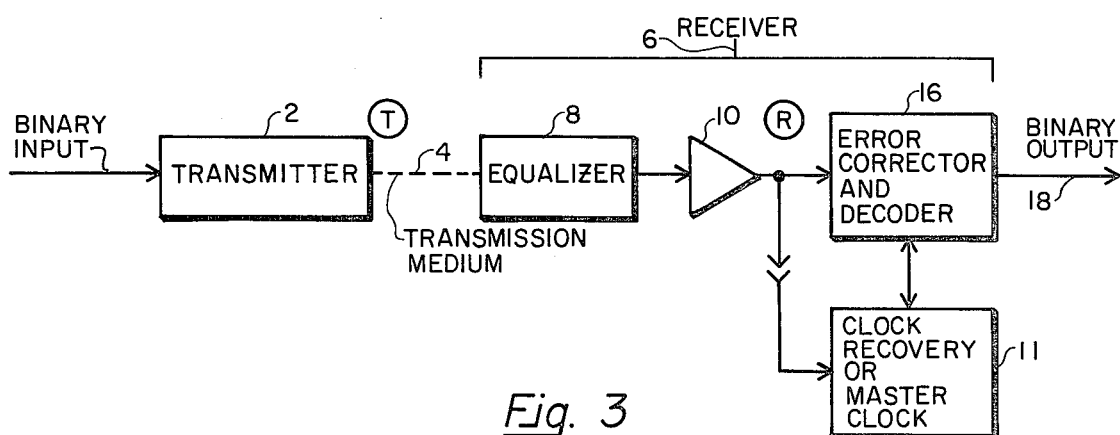
Fig. 3
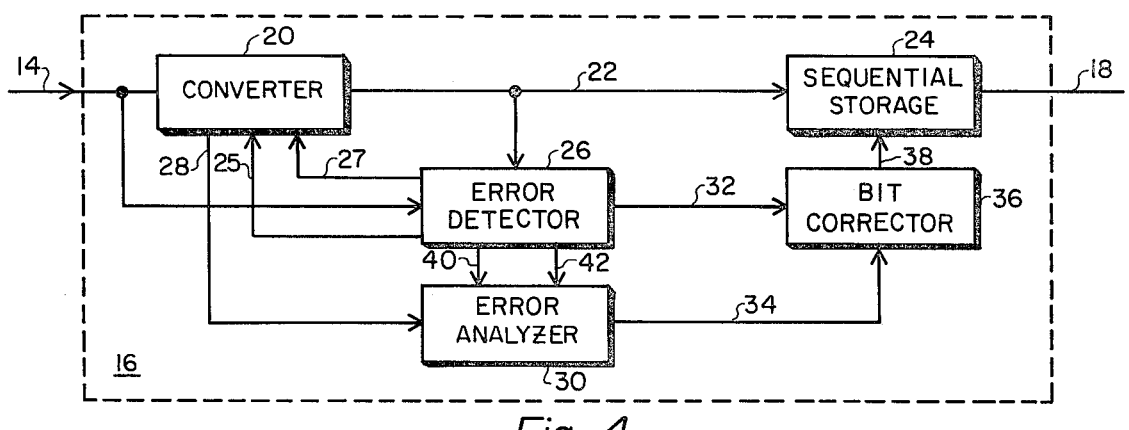
Fig. 4
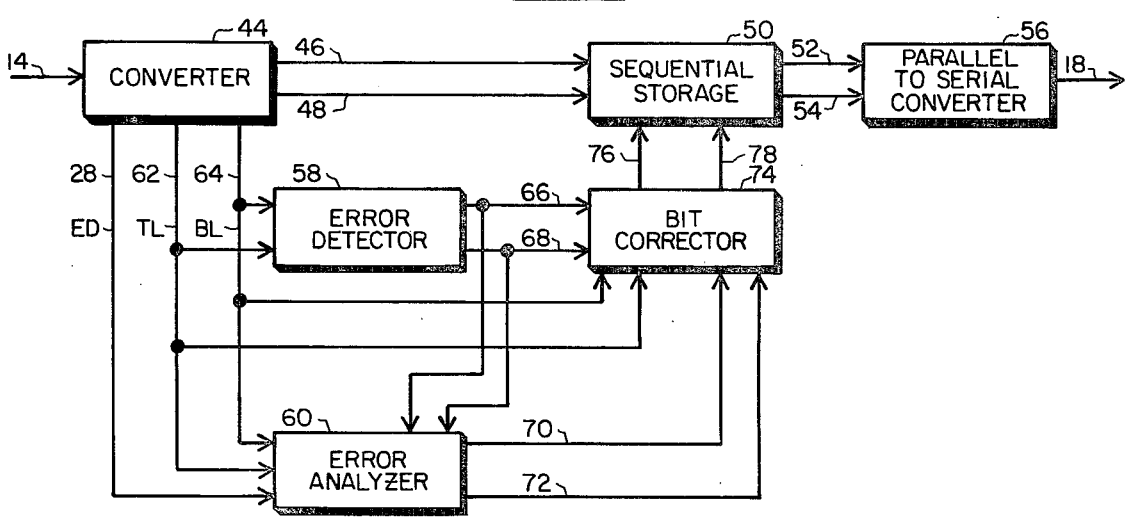
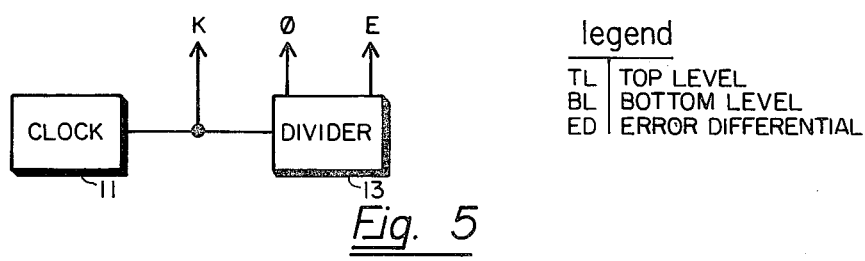
Fig. 5

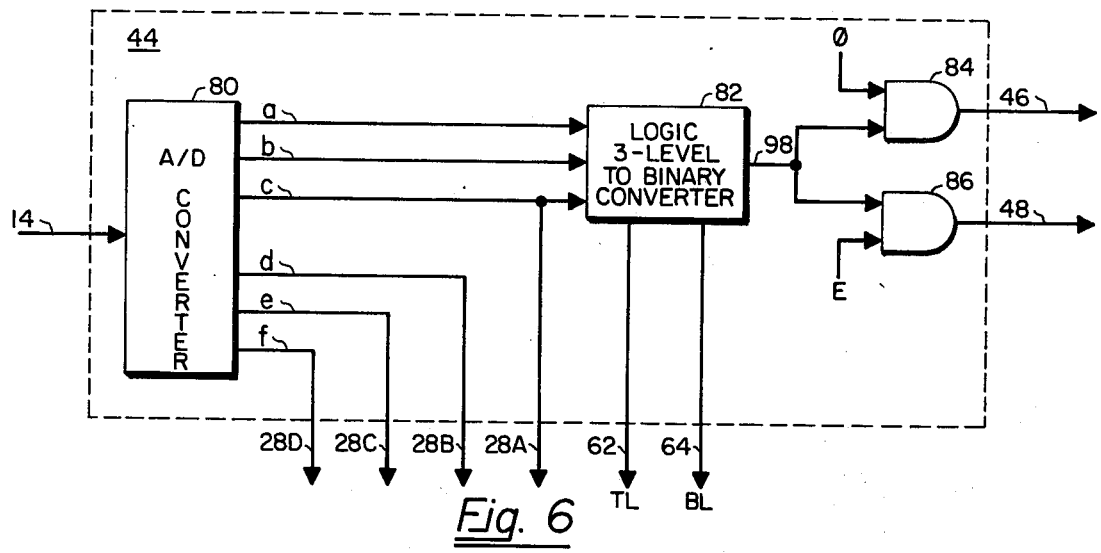
Fig. 6
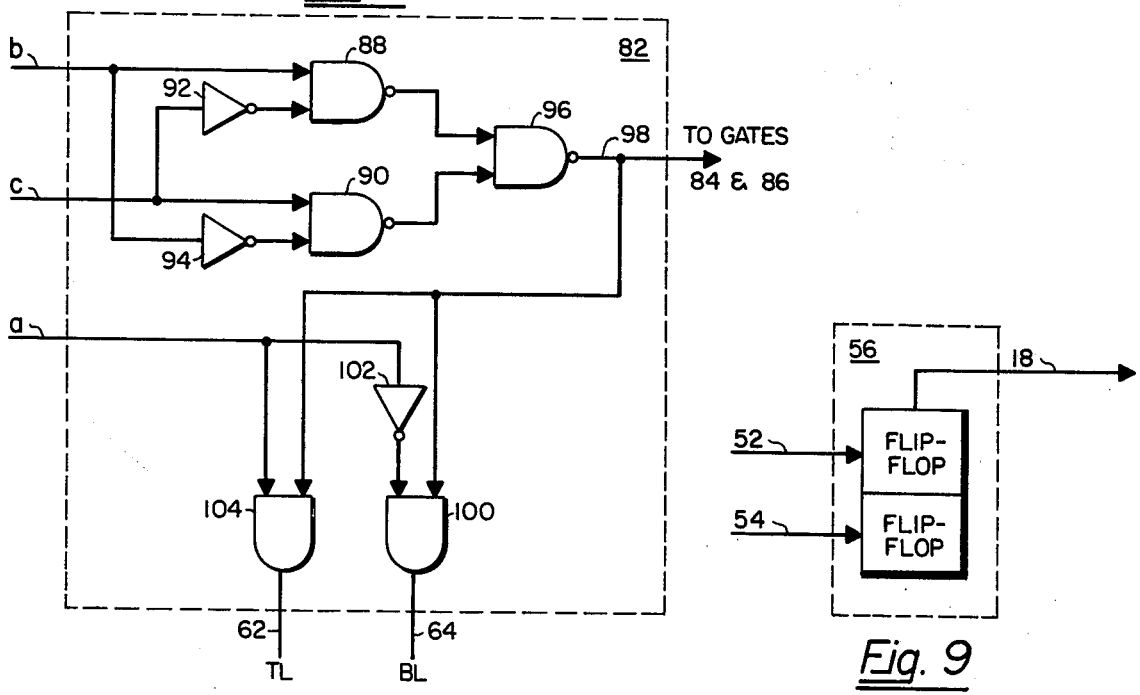
Fig. 7
Fig. 9
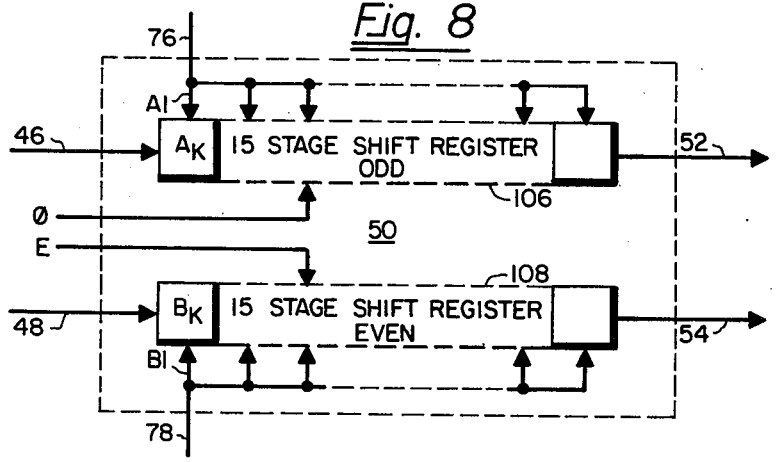
Fig. 8

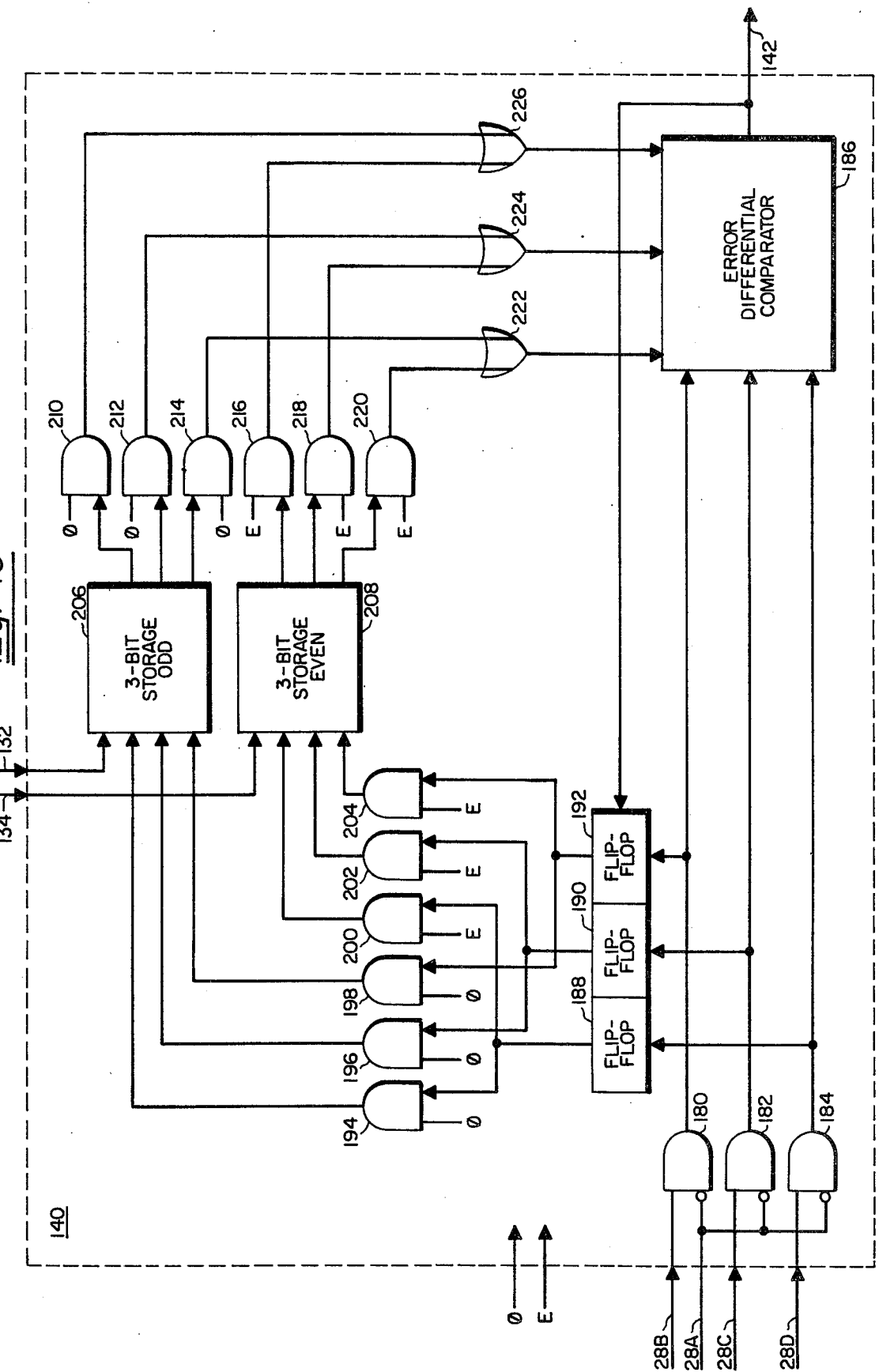

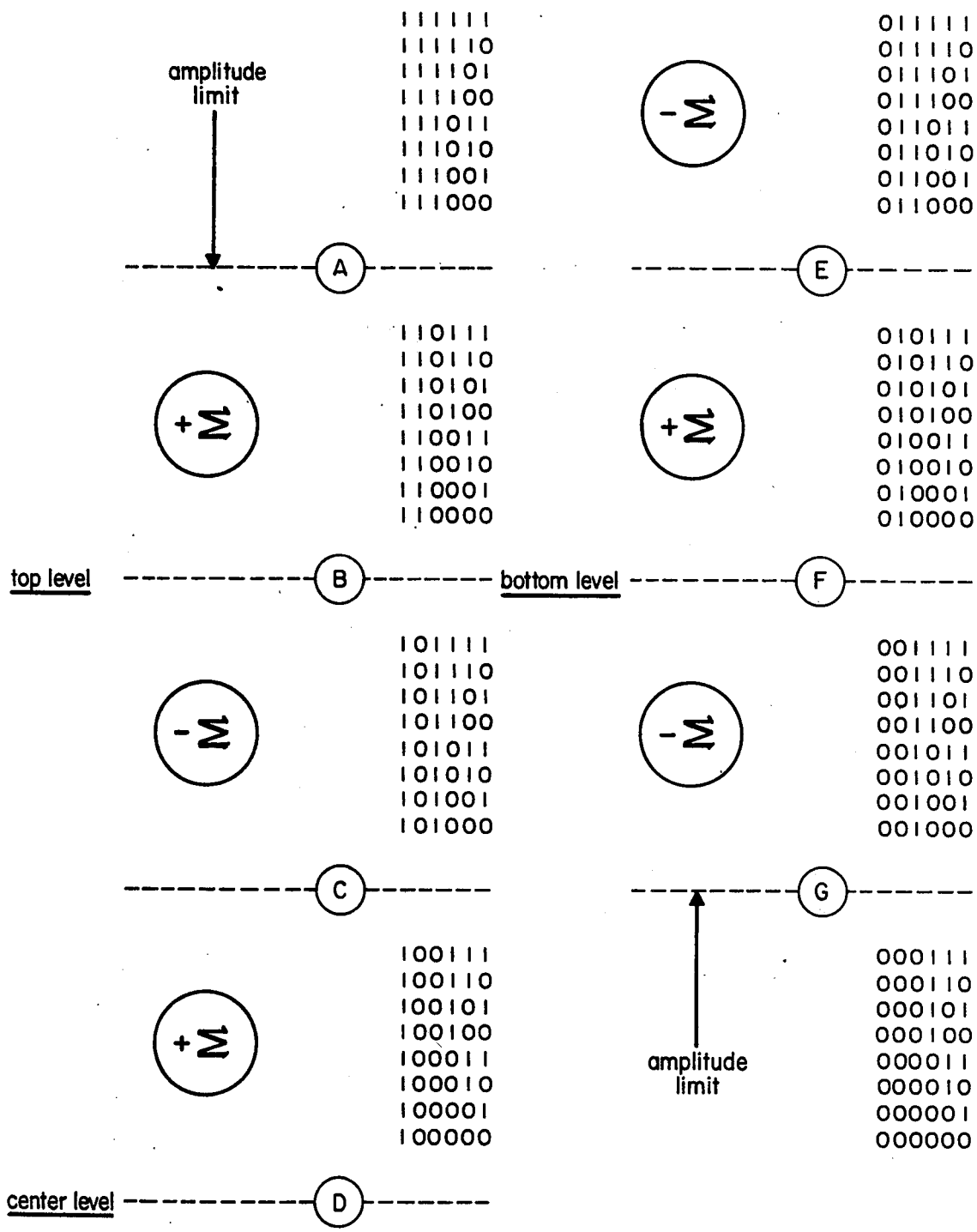

ERROR CORRECTION FOR SIGNALS EMPLOYING THE MODIFIED DUOBINARY CODE

BACKGROUND OF THE INVENTION

1. Field of the Invention

This invention relates to techniques and processes for the detection and correction of errors in digital information, and more particularly relates to techniques and processes for correcting errors in signals which employ the modified duobinary code.

2. Description of the Prior Art

Error detection techniques for binary and modified duobinary are well known. One technique for error detection for modified duobinary systems is disclosed in U.S. Pat. No. 3,461,426. More recently, the present inventor filed an application entitled "Error Detection For Modified Duobinary Signals," Ser. No. 742,168, dated Nov. 15, 1976. It is important to note that the error detection process provides an indication of an error after the error occurrence. Unfortunately, the time location of the error is unknown and, therefore, correction of such errors cannot be accomplished by simple error detectors. Rather than attempting to determine the time location of the error per se, prior-art techniques for error correction must often rely on determining the bit in a given sequence which is most likely to be in error. If an error is detected for that sequence, the bit most likely to be in error is altered.

Techniques for improving the integrity of digital information have employed parity check digits. One such technique is described in an article entitled, "Error Detecting and Error Correcting Codes," R. W. Hamming, Bell System Technical Journal, Vol. 29, pp. 147-160, April 1950. In this technique, Hamming devised a code that corrects all single errors. The code consists of adding $k$ suitably chosen check digits to the $m$ message digits. If another digit is added, double errors can be detected as well as single errors corrected. A different code is described in an article entitled, "Coding For Constant-Data-Rate Systems — Part I, A New Error-Correcting Code," by R. A. Silverman and M. Balser, IRE Proceedings, pp. 1428-1435, September 1954. This latter article describes the Wagner code in which a transmitted word consists of a sequence of $m$ message digits and an additional digit used as a parity check. As each of the perturbed digits $y$ arrives at the receiver, the a posteriori probabilities $p(x_1/Y)$ and $p(x_2/Y)$ are calculated. Each digit of the received sequence is tentatively identified as $x_1$ or $x_2$, depending on whether $p(x_1/Y)$ or $p(x_2/Y)$ is larger, and the values of the a posteriori probabilities are stored in a memory for the duration of a word. The sequence thus obtained is checked for parity. If the parity is correct, the word is printed as received. If the parity check fails, the digit for which the difference $\Delta p$ between a posteriori probabilities is the smallest is considered the digit most in doubt and the word is printed with this digit altered. The receiver then clears the stored values of the probability differences from the memory and proceeds to the next word. Thus, the Wagner code may be characterized as one which has a high probability for correction of single errors. Multiple errors would normally always be printed incorrectly.

With respect to the Wagner method of error correction as described in the above-noted September 1954 article, certain disadvantages result from its use. First, the binary data bit stream is divided into words each consisting of a sequence of message digits $m$ and a single redundant digit. Thus, $(m + 1)$ digits are sent and the redundancy is $1/m + 1$ or for $m = 5$ a redundancy of about 20%. Further, for the Wagner method and for any method which requires the use of redundant digits, each bit period, i.e., time slot, must be reduced initially if it is desired to retain the same bit rate following correction. Once the redundant bit has been employed for its function, that bit is removed. Despite these disadvantages, use of the technique, indeed, results in a dramatic improvement in error rate as is shown in the above-noted September 1954 paper.

More recently, the theory of error correction was further developed in a paper entitled, "Maximum-Likelihood Sequence Estimation of Digital Sequences In The Presence Of Intersymbol Interference", by G. David Forney, Jr., pp. 363-378, IEEE Transactions On Information Theory, May 1972. The sequence estimator was for use with a digital pulse-amplitude-modulated sequence in the presence of finite intersymbol interference and white Gaussian noise. The structure includes a sample linear filter called a whitened matched filter, and a recursive nonlinear processor called the Viterbi algorithm. This structure is a maximum-likelihood estimator of the entire transmitted sequence.

Intersymbol interference is normally considered to be a primary impediment to reliable high rate digital transmission over high signal-to-noise ratio narrow-band channels such as voice-grade telephone circuits. Intersymbol interference is also introduced deliberately for the purpose of spectral shaping in certain modulation schemes for narrow-band channels called duobinary, partial-response, and the like. In his paper, Forney presents a simplified, but effective, optimum algorithm suitable for some partial-response schemes. In particular, beginning at page 373, under the heading "A Practical Algorithm", the discussion is directed to an algorithm suitable for use with the class of partial-response schemes defined by $f(D) = 1 \pm D^n$, with $f(D) = 1 - D$. The error-correction algorithm block diagram is shown in his FIG. 9, and the flow-chart for error correction with partial-response is shown in his FIG. 10. In the technique illustrated, the method for determining whether the tentative decision sequences are allowable is determined by passing the sequence through an inverse linear filter (shown in his FIG. 8 of the article) with an impulse response $1/f(D)$ to see whether an allowable input sequence comes out. The filter used includes a feedback network such as is illustrated in his FIG. 8 of the article.

Whenever an error is made, it is noted that the feedback network causes the error to continue to propagate in the circuit which affects all subsequent outputs. In each case, the output will be one unit higher than the corresponding input. Localization of the error in a finite time span requires information about the reliability of each of the tentative decisions previously made. For any reasonable noise distribution, the tentative decision most likely to be in error is that for which the error differential, i.e., the difference between the received amplitude and the standard amplitude for that level, has the largest magnitude with the appropriate polarity. The tentative decision for that location is considered to be in error and the bit is altered.

For a 3-level modified duobinary system, it is neither necessary nor desirable to use code words or blocks such as are used for the Wagner or Forney systems. In the instant invention, block length in a way is a variable and is essentially defined as the interval established by two successive extreme level bits. Also of importance is the fact that no redundant parity digit is necessary for use in detecting single errors. Thus, no redundancy is introduced at the transmitting end. In the instant invention, because of specific correlative patterns in the code, the polarity of error can also be determined, i.e., whether or not positive or negative. Thus, the process of identifying error location may be substantially reduced, on the average by a factor of two, as compared to Wagner's method.

As with the prior-art techniques discussed hereinabove, the noise impairment in the transmission medium should be such that a reasonable signal-to-noise ratio is obtained for most effective performance of the error corrector. By reasonable is meant a signal-to-noise ratio such that the line error rate is no worse than $10^{-3}$. For such a line error rate in the presence of, for example, Gaussian noise, most errors occur only between adjacent signal levels. The probability of an error occurring between nonadjacent levels, such as between the top and bottom levels, is negligible in that it is in the order of say $10^{-25}$. Such conditions most often prevail in most telecommunication transmission facilities. Thus, error occurrences not between adjacent levels can be desregarded for all practical purposes and the assumption of errors occurring between adjacent levels is valid for the overwhelming majority of existing transmission systems. It is also important that the majority of errors are single errors, since the technique which is based on the correction of the bit having the greatest error differential, and, thus, the most likelihood of error, can only be directed to one single bit within an error correction interval. The above conditions are desirable for optimum performance of the error corrector, but are not an absolute requirement. These conditions generally obtain in present day telecommunication transmission facilities.

SUMMARY OF THE INVENTION

Apparatus for correcting single errors in a signal employing a 3-level modified duobinary code includes storage facilities for sequentially storing a finite number of bits of the signal. Prior to storage, a tentative decision is made as to the state of each bit. An error detector determines if an error has occurred during an error correction interval which is determined by extreme level appearances of the modified duobinary code. The error differential for each individual bit is determined and the location of the stored bit having the greatest error differential is tracked. If an error has occurred during the error correction interval, the tentative decision for the state of the bit having the greatest error differential is considered to be in error and that stored bit is changed to the other binary state.

BRIEF DESCRIPTION OF THE DRAWING(S)

FIG. 1 is a waveform diagram showing the standard levels for a modified duobinary waveform and some of the error differentials which may occur as a result of disturbances during transmission of the wave;

FIG. 2 illustrates a transmitted waveform without errors and a received waveform having two negative error occurrences and a positive error occurrence;

FIG. 3 is a system block diagram illustrating a typical environment in which the invention would operate;

FIG. 4 is a block diagram of one embodiment of the invention;

Figure 10:
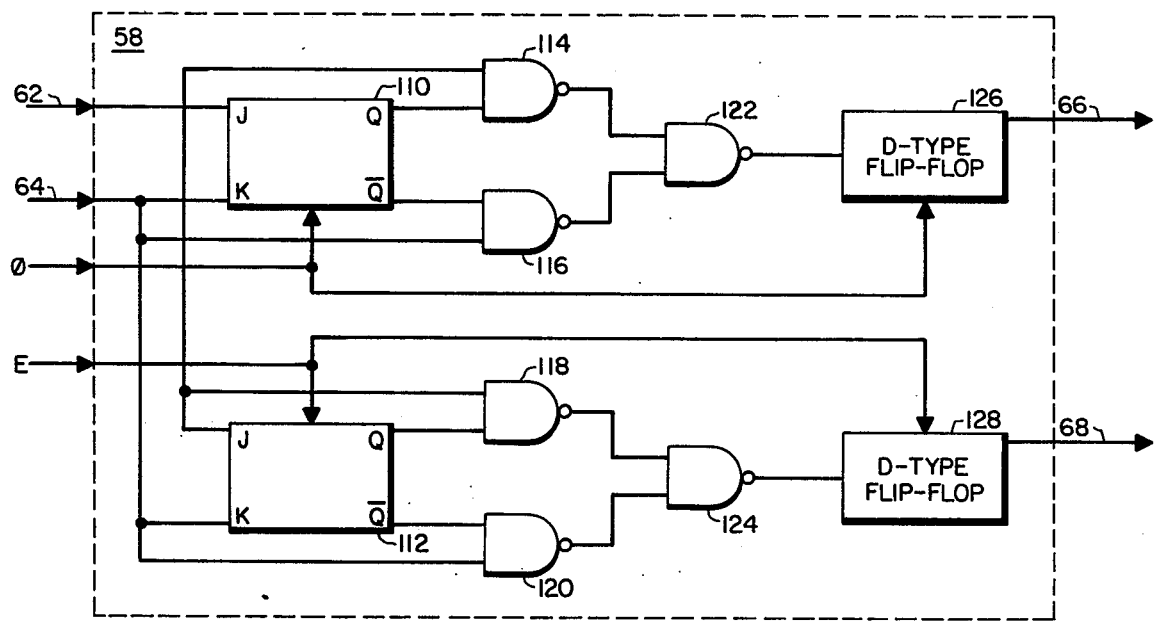
Figure 12:
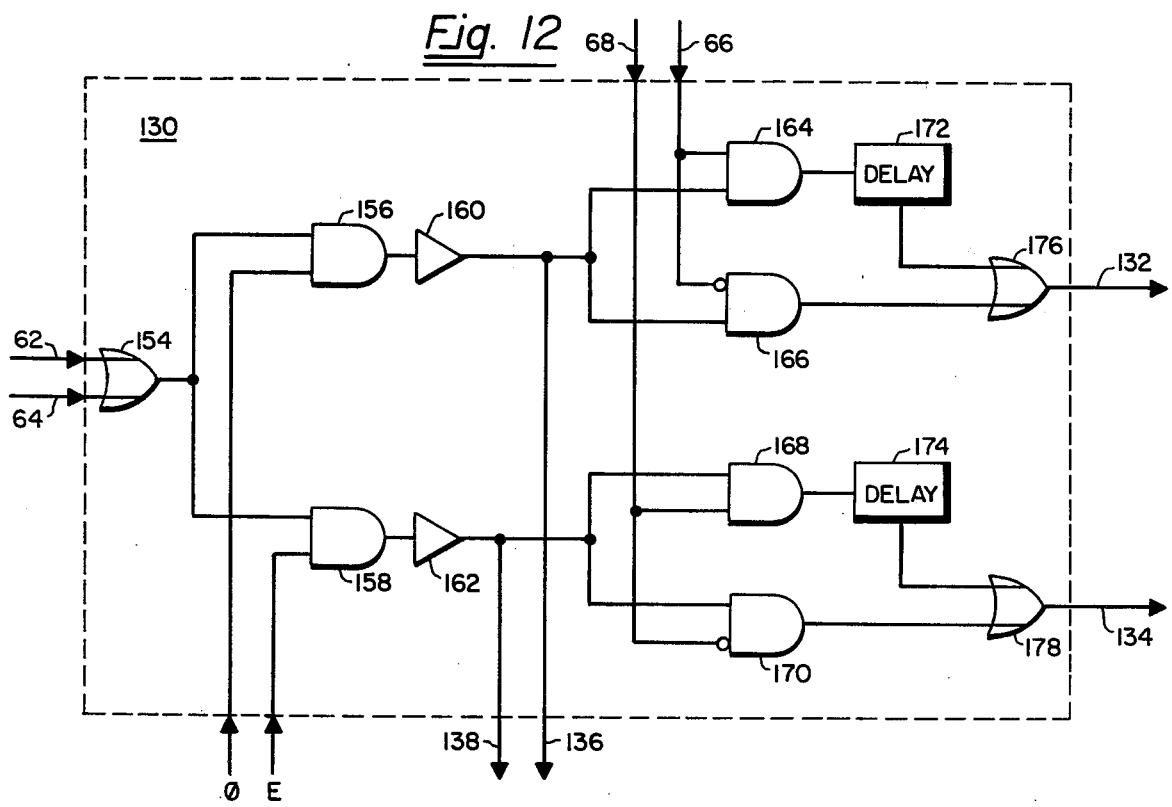
Figure 11:
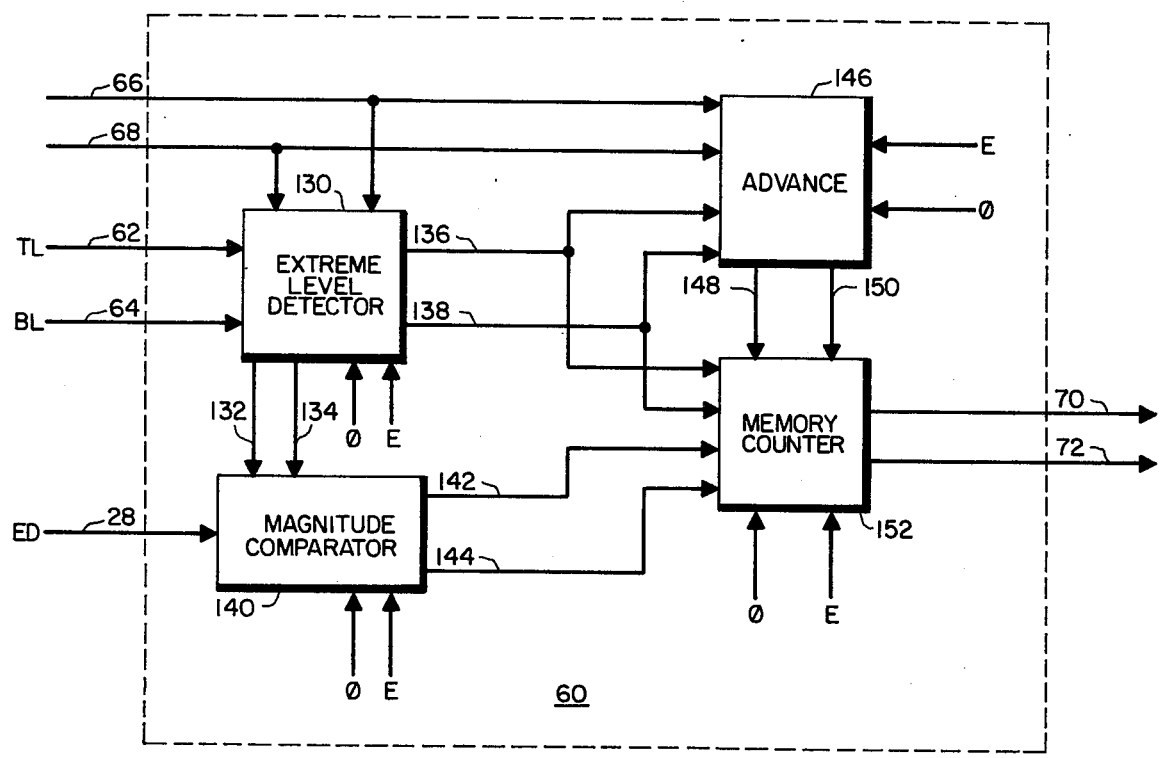
Figure 15:
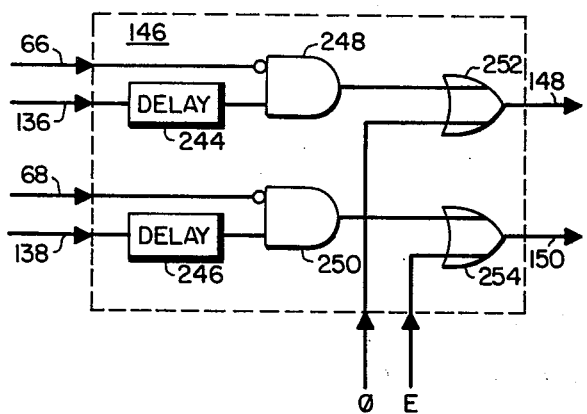
Figure 14:
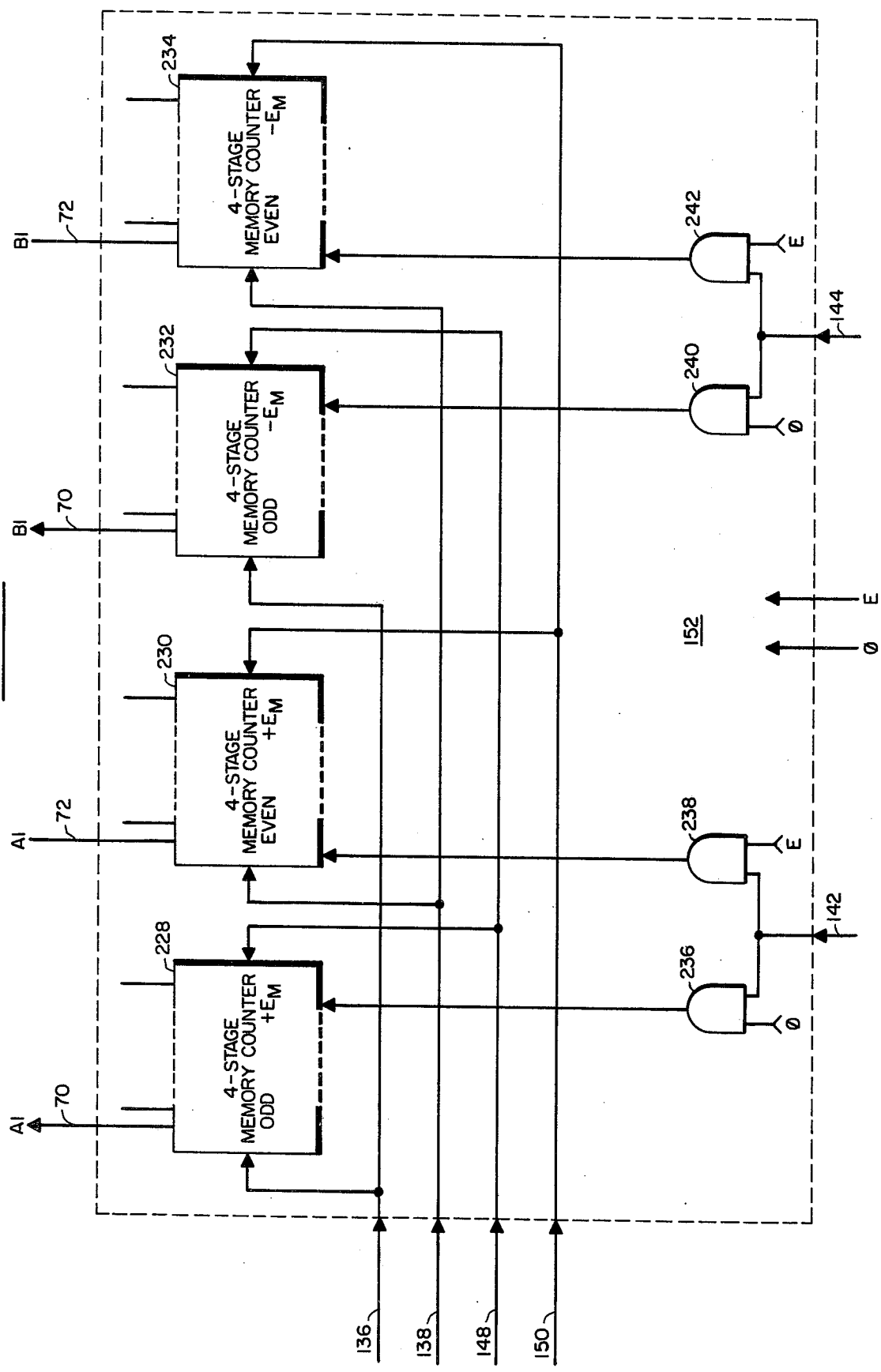

FIG. 5 is a simplified block diagram of the error correction circuitry 16 of a second embodiment of the invention including clock 11 and divider 13;

FIG. 6 is a block and logic diagram of converter 44 in FIG. 5;

FIG. 7 is a logic diagram of an implementation performing the functions required of logic 3-level to binary converter 82 in FIG. 6;

FIG. 8 is a block diagram of sequential storage 50 shown in FIG. 5;

FIG. 9 is a block diagram of parallel to serial converter 56 shown in FIG. 5;

FIG. 10 is a block and logic diagram of the error detector 58 shown in FIG. 5;

FIG. 11 is a block diagram of the error-likelihood analyzer 60 shown in FIG. 5;

FIG. 12 is a logic diagram of the extreme level detector 130 shown in FIG. 11;

FIG. 13 is a block and logic diagram of the magnitude comparator 140 shown in FIG. 11;

FIG. 14 is a block and logic diagram of memory counter 152 as shown in FIG. 11;

FIG. 15 is a logic diagram of advance 146 as shown in FIG. 11; and

Figure 16:
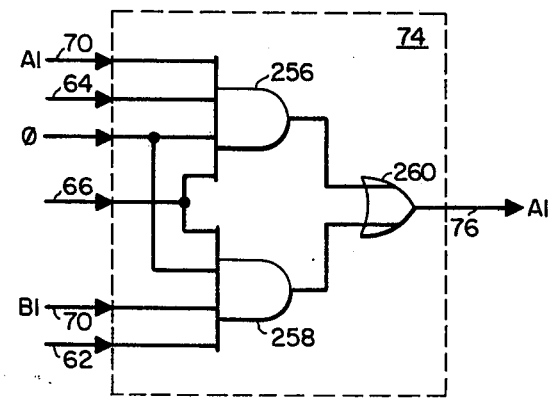

FIG. 16 is a logic diagram of one unit of the bit converter 74 shown in FIG. 5.

Table I shows the amplitudes for all signal levels represented by the six digit code words.

DETAILED DESCRIPTION OF THE INVENTION

As was briefly noted hereinabove, prior-art systems used a fixed block length for evaluation and determination of error occurrences and error location. This was required because a parity digit was used to determine if an error had occurred during the block. Because of the character of the modified duobinary code, as disclosed in U.S. Pat. Nos. 3,457,510 and 3,461,426, it may be seen that the interval for detecting errors may be set by successive extreme levels of the code. Thus, the error correction interval for my invention is not fixed. Rather, it has a variable length. The error correction interval always ends on an extreme level bit, either top or bottom. When an extreme level occurs, an error detector will determine if a detectable error occurred during the preceding interval, which interval does not include the ending extreme level bit. If no error is detected, the next cycle begins during the same bit interval (extreme level), i.e., the ending extreme level bit is included in the subsequent error correction interval. If, in fact, an error has occurred in the error correction interval, but had not been detected immediately following the occurrence of the extreme level bit at the end of said error correction interval, the subsequent error correction interval also includes that extreme level bit which occurred at the end of the previous error correction interval. However, when an error occurs and is detected upon the occurrence of the extreme level bit at the end of the error correction interval, said interval ends during that extreme level bit and the next error correction interval starts with the immediately following bit. To summarize, the error correction interval always ends on an extreme level bit and a new cycle starts on the same bit, i.e., the ending extreme level bit, as long as no error is detected. Should an error occur and be detected, the new cycle will start on the bit which immediately follows the extreme bit at the end of the error correction interval.

FIG. 1 graphically illustrates some of the principles discussed hereinabove. First, it is to be noted that the solid line waveform is representative of an idealized signal such as would be sent out from the transmitting terminal, and also is representative of an ideal such as one would desire at the receiver following the correction of all line discrepancies, and which includes any perturbations which would create uncorrectable distortions in the waveform. The dotted line illustrates what would be more representative, or typical, of a received, equalized and corrected waveform which includes the effects of the noise such that the actual amplitude at the sampling instants do not match that of the standard levels. Note at the left-hand side of the waveforms, the letters illustrate the various amplitudes wherein the B, D and F levels illustrate the standard levels and the dotted lines at C and E indicate the slicing levels. On the waveform diagram itself the indications of −E and +E illustrate the difference in amplitude of the typically received waveform from that of the standard. The negative indicates an error differential which is such as to reduce the amplitude of the standard wave and is illustrated in time slots 1, 8 and 16. The positive error differentials are those which would increase the amplitude of the sample bit and these are as illustrated in time slots 2, 3, 13, 14 and 15. While the error differentials are illustrated only with respect to the extreme levels in FIG. 1, it is to be noted that the error differential would, in fact, be determined for each bit in an error correction interval, so that the bit having the largest error differential may be determined for that error correction interval.

FIG. 2 illustrates the variable error correction interval and the effect of an error occurrence on said interval. Referring now to FIG. 2, transmit, T, and receive, R, waveforms are illustrated. The transmit waveform is naturally shown without errors and is shown in idealized form. The received waveform is shown in idealized form but includes a negative error at time slot 6, a positive error at time slot 10, and a negative error at time slot 17. Each error is shown in dotted form. Error correction, as taught by this invention, can occur only after an error has been detected within an error correction interval, which interval is determined by two successive bits at extreme levels. In reviewing the modified duobinary waveform including errors such as are shown at R in FIG. 2, it is apparent that the error occurring at time slot 6 will not be detected during the interval from time slot 2 to time slot 6, since the error in time slot 6 does not violate the coding rules during this interval. Because the error was not detected during the time slot 2–6 interval, the bit in time slot 6 is included in the next succeeding error correction interval which, in this case, includes time slots 6 and 7. Error detection should occur upon receipt of the extreme level bit in time slot 8 and correction would then follow.

Waveforms RO and RE are the half-bit rate odd and even alternating polarity pulse trains which may be obtained from the received waveform R. Since each pulse train RO and RE must necessarily follow the alternating polarity coding rules, error occurrences are immediately apparent. It is to be recalled that in the alternating polarity code, successive pulses must be of opposite polarity.

It is important to consider the types of errors that may occur, i.e., single errors, and to note their effect on the character of the waveform. The first type of error considered is the error of omission. In this case, one of the bits at extreme levels is wiped out or, equivalently, interpreted as a center level at the receiver. To be more specific, assume that a negative pulse which is transmitted is detected as a zero at the receiver. In order for this to occur, the noise disturbance which caused a negative pulse to be detected as a zero would imply that the noise character must have a positive component to override the negative value of the bit transmitted. This is defined as a positive error, since additive noise must have been positive to wipe out a negative pulse. An error of omission could have occurred at time slot 8 in which case the negative pulse would appear as a zero both in waveform R and waveform RE. Should this have occurred, it is apparent, in viewing waveform RE, that the two extreme levels existent on either side of the error, appearing at time slots 2 and 12, are both positive. The fact that successive pulses in waveform RE are positive indicates that an error has occurred and would be detected. Further, it is interesting to note that the polarity of the last extreme level, which appears at time slot 12, is positive, and this agrees with the polarity of the noise component which created the error. Thus, it is apparent that the polarity of the extreme level pulse, at the instant of error detection, will, in this case, correctly indicate the error polarity. It can be similarly shown that when a positive pulse is wiped out by a negative noise component the polarity of the extreme level pulse, at the instant of error detection, will also indicate correctly the error polarity which, in this case, will be negative.

In addition to errors of omission which are ones that eliminate extreme level pulses in the 3-level modified duobinary signal, there also can occur errors of commission. In this case, the center-level bits are altered by the noise component. It is apparent that the effect can be either positive or negative depending upon the polarity of the noise component. Referring again to FIG. 2, assume that the situation exists between time slots 8 and 12, as shown in waveform T. Here, we have a negative pulse at time slot 8 followed by three center level bits which are, in turn, followed by a positive pulse. Assume that due to a positive noise component in the transmission path the center level bit in time slot 10 is changed into a positive pulse, as shown in waveform R, FIG. 2. At the time of this error occurrence, no detection is possible as the negative followed by a positive pulse in the pattern, as shown, is not a violation of the coding rules. However, at the time of occurrence of the next extreme level pulse, the error detector will determine that an error has occurred because there will be successive extreme level pulses both having the same polarity, namely, positive. If it is assumed that the error is negative, i.e., the center level is converted to a negative pulse in time slot 10 due to negative additive noise, it is apparent that the error would be detected at this time because, in this case, there would have been two successive negative extreme level pulses. It is also important then to note that whether the error is converted to a positive level pulse or a negative level pulse, that in each instance described, the extreme level pulse immediately following the error of commission will have the same polarity as the error. Based on a careful analysis of the polarities of the errors and of the polarity of the extreme level pulse at the instant of error detection, it has been determined that the polarity of the error differential, which caused the error to occur, is automatically provided by the polarity of the extreme level pulse which occurs at the end of the error correction interval.

Thus, there is no need to resort to the past history of the waveform to find the error polarity of the error differential.

Referring now to FIG. 3, a typical environment within which the error corrector may operate is shown. A binary input is assumed into transmitter 2, which conditions the input signal for transmission. One requirement of the conditioning process is that a modified duobinary waveform may be obtained at receiver 6. There, transmitter 2 could include carrier current terminal equipment for the transmission of a relatively low-speed data signal over a carrier derived voice channel. Alternatively, and/or in addition, transmitter 2 could include a radio transmitter. While not shown, receiver 6 would necessarily include the equipment which would recover the modified duobinary waveform. However, such equipment is well known. If appropriate, the receiver 6 would include equalizer 8 to reshape the received signal and amplifier 10 to compensate for loss in transmission. Clock recovery could be obtained from the incoming signal as is well known. One such technique is illustrated in U.S. Pat. No. 3,707,683. Block 11 could be a master clock, in which case the arrowed connection is open, or it could be a clock recovery circuit, in which case the arrowed connection is closed. Error corrector and decoder 16 would normally finally condition the recovered signal and provide a replica of the input signal at its output.

Referring now to FIG. 4, the operational functions performed by error corrector and decoder 16 will now be described. The equalized and amplified modified duobinary signal on path 14 is applied to converter 20 and error detector 26. Converter 20 decodes the modified duobinary in a well-known manner to obtain the decoded binary signal for application along path 22 to sequential storage 24. Storage 24 could be a multistage shift register. Converter 20 also compares the amplitude of the incoming waveform on path 14 with the standard levels (see FIG. 1) for the three level signal, and the error differential thus obtained is applied via path 28 to error-likelihood analyzer 30. Any one of a number of well-known comparison techniques may be used to obtain the error differential. Error detector 26 detects coding violations of the received modified duobinary signal, and also establishes the error correction interval by recognizing the successive extreme level occurrences and by supplying this information to analyzer 30. Error analyzer 30 compares successive error differentials during an error correction interval and tracks the location of the bit having the largest error differential. A magnitude comparator may be used for this purpose. At the beginning of an error correction interval, the error differential in the comparator would be essentially 0. Thus, the error differential of the first bit of the interval would be the largest. A memory counter is started which will shift at the same rate as sequential storage 24. If the error differential of the second bit in the sequence is smaller than the error differential of the first bit, the memory counter steps to the second position along with storage 24. This continues either until a larger error differential appears or an extreme level occurs. If it is assumed that a larger error differential occurs at the eighth bit in the sequence, the memory counter now will be reset to 1 to follow the eighth bit through sequential storage 24. Assume that an error occurs during the sequence and is detected at the twelfth bit, which is an extreme level bit. Further, assume that no larger error differential has occurred. Thus, the memory counter will show the bit most likely to be erroneous as being at the fifth bit position in storage 24. Error detector 26 provides an output on path 32 which alerts bit corrector 36 to the fact that an error has occurred, and error analyzer 30 selects the element of the memory counter which is connected to alter the bit in bit position 5 of storage 24. It is apparent that there could be a plurality of outputs from the memory counter, one for each bit positon of storage 24. Each separate output of the memory counter would be connected to a separate bit corrector circuit for each of the bit positions. Simple logic circuits would then be employed in the bit corrector 36 to provide the required input to the selected bit position following an error occurrence.

Another embodiment of the invention is illustrated in block form in FIG. 5. More detailed block and logic diagrams of elements used in the embodiment of FIG. 5 are shown in FIGS. 6-16.

For purposes of this discussion only and not as a limitation, it will be assumed that the bit rate of the modified duobinary signal is 3 Mbits/sec. Thus, a bandwidth in the order of 1.5 MHz would be employed.

Referring now to FIG. 5, a clock 11 has a clock rate equal to the bit rate, e.g., 3 Mbits/sec., which is applied to divider 13 and is available at output K. Divider 13 divides the clock rate by two and provides at one output Φ a half-rate clock signal having one phase and at a second output E another half-rate clock signal of a phase opposite from that of Φ. These clock signals are available to provide the necessary timing and their use is generally illustrated, in a number of cases, in the diagrams as well as in the following description. The equalized and amplified modified duobinary signal on path 14 is applied to converter 44, which provides several outputs. The manner in which the output signals are derived is illustrated in FIGS. 6 and 7.

Referring now to FIG. 6, it is seen that the analog modified duobinary on path 14 is converted into a six bit code word, for this particular example, for each amplitude sample by A/D converter 80. A/D conversion is well-known The number of bits used in a code word depends upon the accuracy required. Fewer or more could be used depending upon the application. Certain of the amplitude representations were shown in FIG. 1. Table I shows the amplitudes for all levels represented by the six digit code words. It should be noted that the amplitude limit is represented by the code 110111, shown at A, FIG. 1, whereas the minimum amplitude level is represented by the code 001000, shown at G, FIG. 1. Amplitudes above and below these limits A or G are not read by the subsequent equipment. The standard level for a top level positive pulse is shown at B in Table I. Amplitudes in excess of B represent a positive error differential whereas those below the level B and above level G represent a negative error differential. A careful review of the amplitudes lying between A and G indicates that the third bit, C, of a code word indicates the polarity of the error, i.e., 0 representing a positive error and 1 representing a negative error. The last three bits of a code word are a measure of the error differential. Following the rationale explained for the top level, it may be seen that the center level extends from C to E with the center level occurring at D, and the bottom level extends from E to G with the standard bottom level appearing at F.

Referring again to FIG. 6, it may be seen that the first three bits of a code word represented as $a$, $b$ and $c$ are applied to logic 3-level to binary converter 82, which converts the code word input into a binary signal which appears on path 98, and also provides a separate binary signal for the top level or for the bottom level, on paths 62 and 64, respectively, whenever these occur. One technique for accomplishing this result is shown in FIG. 7, where the second and third bits, i.e., $b$ and $c$ of the code word, are applied to an Exclusive OR-gate represented therein by gates 88, 90 and 96. Inverters 92 and 94 are required since the inverted form of the $b$ and $c$ digits is not otherwise available. Referring again to Table I, it may be seen that the presence of either a top level or a bottom level binary digit is represented by the second and third code word bits, either when $b = 1$ and $c = 0$, or when $b = 0$ and $c = 1$. It may also be seen that the second and third code word bits representing the center level are either 0 and 0, or 1 and 1. It is evident from the Truth Table of an Exclusive OR-gate that there will be an output from gate 96 representative of a binary pulse whenever either a 0 and 1 or 1 and 0 appear at the inputs $b$ and $c$. Conversely, whenever the inputs are either 1 and 1 or 0 and 0 there is no output on path 98. Note further, that the amplitudes above and below the amplitude limits would also be represented as a 0 or no output on path 98, since the second and third digits are either binary 1 and 1 or binary 0 and 0. In addition to the binary output on path 98, it is necessary to obtain an output whenever a top level or bottom level occurs, and it is necessary that these be distinguished. This is accomplished by gates 100 and 104 and inverter 102. One input to gates 100 and 104 is the output from gate 96 on path 98. It is apparent that whenever a 0 appears on path 98, AND-gates 100 and 104 will not have an output. Thus, whenever path 98 has a binary 1 output, either a top level or bottom level has occurred. If a top level has occurred, the first code word bit, $a$, is a 1, and if a bottom level has occurred, the first bit is a 0. It is apparent that delays are required in the path for the first bit, $a$, in order to provide the proper timing between the output of gate 96 and the input from the first bit $a$. Also, it is apparent that gate 104 will have an output whenever a binary 1 appears on path $a$ and a 1 appears on path 98. Conversely, gate 100 will have an output whenever a 0 appears on path $a$ and a 1 appears on path 98. Thus, there is a binary 1 output on path 62 whenever a top level appears, and a binary 1 output on path 64 whenever a bottom level appears.

Referring again to FIG. 6, it may be seen that the last four bits, i.e., $c$-$f$, of the code word are applied to output paths 28. As stated hereinabove, the last three bits provide the error differential amplitude, and it may be seen referring to Table I that the third bit, $c$, indicates the polarity of the error differential. Thus, the magnitude and polarity of the error differential is available on paths 28.

The binary output of logic 3-level to binary converter 82, on path 98, is applied to one input of each AND-gate 84 and 86. A second input to AND-gate 84 is the $\phi$ phase of the half-rate clock, and the second input to AND-gate 86 is the other E phase of the half-rate clock. AND-gates 84 and 86 thus select alternate bits from the binary output of logic 3-level to binary converter 82. Since it is apparent that one set of alternate bits may be considered to contain odd numbered bits and the other even numbered, and since the odd and even number assignments are arbitrary, the gate 84 is considered to pass only the odd numbered bits of the binary output on path 98, and gate 86 is considered to pass only the even numbered bits. Thus, in subsequent discussion, $\phi$ and/or odd represent the arbitrarily assigned odd numbered bits, and E and/or even represent the even numbered bits. Likewise, the $\phi$ clock output is considered odd and the E clock even. The odd and even binary outputs are transmitted along paths 46 and 48, respectively.

In this embodiment of the invention, two separate 15-stage shift registers are used, one for the odd and one for the even bits, as shown in FIG. 8. The binary digits received along paths 46 and 48 are sequentially stored, respectively, in the odd shift register 106 and the even shift register 108. Thus, each binary digit will pass through a register, either odd or even, and out along the output paths 52 or 54. There is a separate input on path 76, i.e., 76 is a multipath connection, to each stage of the odd shift register and along path 78, i.e., 78 is a multipath connection, to each stage of the even shift register, so that error correction can be effected for only one stage as will be described hereinafter.

A simple parallel-to-serial converter 56 is shown in FIG. 9 wherein two flip-flops, one accepting inputs over path 52, the other accepting inputs from path 54, are combined to provide a corrected serial binary output on path 18. Operation of such arrangements is well known and will not be discussed further here.

An error detector 58, such as may be effectively used in this error correction technique, is shown in block and logic diagram in FIG. 10. The bottom level and top level outputs from logic 3-level to binary converter 82 appear on paths 64 and 62, respectively, J-K type flip-flops 110 and 112 receive these outputs with the bottom level being applied to the K inputs and the top level being applied to the J inputs. Flip-flop 110, NAND-gates 114, 116 and 122, and D-type flip-flop 126 comprise the odd bit sequence error detector. A similar circuit arrangement is employed to detect error occurrences for the even bit sequence as shown. Therefore, only the operation of the odd bit sequence error detector will be described.

Timing for flip-flop 110 is obtained from the half-rate output of the odd clock $\phi$. NAND-gate 114 has as one input the Q-output of flip-flop 110 and has as a second input the top level signal. NAND-gate 116 has as one input the Q output of flip-flop 110 and has as a second input the bottom level signal. The outputs of gates 114 and 116 are applied as inputs to gate 122. The output of gate 122 is applied to the D input of D-type flip-flop 126. A second input to flip-flop 126 is the odd output from the half-rate clock. If both the J and K inputs are 0, i.e., no top or bottom pulse exists at the instant, the Q and Q outputs do not change state. Thus, if a top level input is applied to the J input of flip-flop 110, for example, the Q output will becomary a binary 1 at the next time interval as determined by the odd clock $\phi$. Thus, NAND-gate 114 would have a binary 1 input at that time. If a subsequent top level pulse should appear on path 62 before a bottom level pulse appears on path 64, then gate 114 would have inputs of binary 1 and 1, and the output would therefore be binary 0. With a binary 0 input to NAND-gate 122, its output will be a binary 1 which is then applied to the D input of D-type flip-flop 126. Thus, an error will be read out on path 66. The even circuit operates in a similar manner as is apparent from FIG. 10 and will not be described here. Thus, it is seen that the errors occurring in the odd and even pulse trains derived from the modified duobinary signal are detected by error detector 58. When an error is detected this is indicated by a signal on the path 66 or 68, as appropriate.

A block diagram of the error analyzer 60 is shown in FIG. 11. Error signals from error detector 58 appear on 66 or 68 and are applied both to extreme level detector 130 and advance 146. The extreme level detector 130 is also connected to receive top level and the bottom level inputs on paths 62 and 64, respectively. An output on path 136 or 138 denotes, respectively, the occurrence of an odd or an even extreme level. An output on path 132 or 134 also denotes, respectively, the occurrence of an odd or even extreme level. However, in this case, the effect of the detection of an error is considered. If there is no error, the output is immediately available to reset a storage in magnitude comparator 140. If an error is detected, a small delay is introduced, before the signals appear on paths 132 or 134. This small delay is necessary when an error occurs in order to perform the four functions that are required to correct the error prior to the next step in the process. This will be discussed later in more detail.

Magnitude comparator 140 receives the error differential output from converter 44 on input path 28. This comparator 140 stores the largest error differential by comparing the currently stored error differential with succeeding error differentials, and supplies information over paths 142 and 144 to memory counter 152 which tracks the location of the maximum error differential. In this arrangement, the maximum error differential for both the odd and even, as well as positive or negative polarity, may be stored. At the end of the error detection interval, if an error has not been detected, magnitude comparator 140, advance 146 and memory counter 152 are reset. However, if an error occurs, memory counter 152 will supply the bit location for the odd or even bit of proper polarity which has been determined to be in error. This will be described in more detail below.

Referring to FIG. 12, a logic diagram shows the operation of extreme level detector 130. The top and bottom level inputs on paths 62 and 64, respectively, are applied to OR-gate 154 which has an output that is applied as one input to AND-gate 156 and, also, to one input of AND-gate 158. The other input to AND-gate 156 is the odd half-rate $\phi$ clock, and the other input to AND-gate 158 is the even half-rate E clock. Thus, the extreme odd level is applied to buffer 160 and the extreme even level is applied to buffer 162. The output of buffer 160 is applied as one input to AND-gates 164 and 166, and also provides an outut on path 136. The output of buffer 162 is applied as one input to AND-gates 168 and 170, and as the output on path 138. The odd error output on path 66 is applied as one input to AND-gate 164, and is applied to the inhibit input of AND-gate 166. If an error occurs, AND-gate 164 would have binary 1 and 1 inputs, thus providing an output which would then pass through delay 172, and OR-gate 176 to path 132. If an extreme odd level occurs, but no error has occurred or been detected, then the inputs to AND-gate 166 are effectively 1 and 1, i.e., the odd error output on path 66 being 0 is converted to a 1 by the inhibit input of circuit 166. Thus, the appearance of an extreme level without an error being detected is immediately passed via OR-gate 176 to path 132. The even portion of the circuit 130 operates similarly.

A portion of the magnitude comparator 140 is shown in FIG. 13. It should be noted that there are two portions to the circuit comprising the magnitude comparator. One portion of the circuit, such as is shown in FIG. 13, is for the storage of the odd and even positive error differentials. The other portion of the circuit would be similar to FIG. 13, but would be used for the detection and storage of the odd and even negative error differentials. In this latter case, the input would be slightly different. Referring to FIG. 13, it may be seen that the error differential is applied via paths 28. In this case, the error differential and its polarity is determined by the last four bits of the code word which are supplied over four separate leads of path 28. The polarity bit, $c$, is supplied via path 28A and the error differential magnitude by the last three digits, $d$, $e$ and $f$ on paths 28B, 28C and 28D, respectively. These inputs are applied as shown to the inputs of AND-gates 180, 182 and 184, and it is to be noted that the polarity input is applied to an inhibit input to these respective gates. This is required because, as was noted hereinabove, the binary symbol for the positive error differential is 0. Thus, the 0 appears as a 1 with respect to operation of gates 180, 182 and 184.

In contrast, for the negative error differential, the input AND-gates would not require the inhibit input for the polarity digit. However, as can be seen from Table I, the outputs from the AND-gates, in this case, must be inverted in order to obtain the proper digital representation of the error differential amplitude. Otherwise, the remaining elements of the error analyzer used for the negative error differential are the same as those shown in FIG. 13. Further, the inputs 132 and 134 are applied to the 3-bit odd and even storage elements for the negative error portion of the error-likelihood analyzer. The error differential output, instead of being on lead 142, would be applied via lead 144 to the memory counter 152 as shown in FIG. 11. By understanding how the positive error differential portion of the error-likelihood analyzer operates and how it cooperates with the memory counter 152, it is believed that the full operation of this negative polarity portion of the circuitry would be understood by those skilled in the art.

At the end of an error correction interval, the extreme level detector 130 will provide an output which is used to reset odd and even storage elements 206 and 208. Once the storage elements are reset, the comparison voltage is 0. Thus, when the first bit of the succeeding error correction interval is read into the error analyzer 60 on paths 28, the the amplitude of the error differential is applied to the input gates. For purposes of our discussion, it will be assumed that all error differentials will be positive so as to confine the discussion to FIG. 13. It is to be understood, however, that the error differentials may be either positive or negative, as well as odd and even. As was noted hereinabove, the error differential is determined by the last 4 bits of the 6 bit code word. Bits $d$, $e$ and $f$ provide the magnitude of the error differential and bit $c$ provides the polarity. A positive error differential would pass through gates 180, 182 and 184, and would be applied to the 3-bit storage consisting of flip-flops 188, 190 and 192. At this same time, the output of gates 180, 182 and 184 would be applied to error differential comparator 186. This differential comparator 186 is a device for comparing magnitudes of successive error differentials, and such magnitude comparators are well known in the art. One such comparator is designated Ser. No. 7485, and is manufactured by Texas Instruments, Incorporated. The magnitude with which the input is to be compared is applied to error differential comparator 186 via OR-gates 222, 224 and 226. For the first bit of the new error correction interval, the input from gates 222, 224 and 226 would be 0 and, thus, the error differential of the first bit would be greater than this and, therefore, there would be an indication output on path 142. This output is also applied back to the memory circuit consisting of flip-flops 188, 190 and 192 to output the error differential in binary coded form via AND-gates 194, 196 and 198 into the odd 3-bit storage 206 as shown in FIG. 13. The other input to gates 194, 196 and 198 is the odd half-rate clock since this is in the first bit of the sequence. If the next positive error differential occurs during the half-rate even clock cycle, it is apparent that the comparison input from gates 222, 224 and 226 will also be 0 and, thus, this error differential will be read into storage 209 via gates 200, 202 and 204. Subsequent positive error differentials will be compared with those stored in either 206 or 208, depending upon whether it is the even or the odd bit being compared. When the positive error differential is less than that which is stored, it will not be read into the storage element. However, when the positive error differential being compared to the stored error differential is equal to, or greater than, that which is stored in the storage element, then this error differential is read into that storage element and that information is supplied to the memory counter 152 via path 142.

Thus, it is apparent that the magnitude comparator 140 stores the maximum error differential for the odd and even bits of a modified duobinary signal and, in addition, stores this information for both the positive and negative error differentials. This information is supplied to the memory counter 152 so that the memory counter will identify and retain the identification and location (track) of the maximum error differential for odd and even as well as positive and negative digits.

The essential elements of memory counter 152 are shown in logic form in FIG. 14. The four 4-stage memory counters 228, 230, 232 and 234 permit a count of 15 with the 16th counter being the reset to "0" state, i.e., 0000. In this embodiment of the invention, each sequential storage element was considered to have a maximum of 15 stages each, although it is anticipated that the error correction interval will normally be less than this. Because of this length of storage, it is necessary that each bit be identified throughout that storage interval. Thus, for example, memory counter 228 is for the odd pulse train wherein there would be a positive error differential. Similarly, memory counter 230 could identify the locatiion of the positive maximum error differential for the even pulse train, regardless of whether is appears at the first bit in the sequence or the 15th. Memory counters 232 and 234 provide similar functions for the negative error differentials. On the occurrence of an extreme level, the memory counters 228, 230, 232 and 234 are each reset to "0" via paths 136 and 138 from extreme level detector 130. As was noted with respect to the discussion of the magnitude comparator 140, the first input following the occurrence of an extreme level will have the maximum error differential for both odd and even pulse trains, because these are being compared to a reset state of the storage elements of the magnitude comparator 140. Thus, an input will appear on either path 142 or 144 depending upon whether the error differential was positive or negative. Assuming again that the error differential was positive, the input along path 142 will appear as one of the inputs to AND-gates 236 and 238. The other input to gate 236 is the odd half-rate clock pulse, and the other input to AND-gate 238 is the even half-rate clock pulse. Because this is the first bit, it is odd, and the odd counter 228 will be set to one, i.e., in binary terms 0001. Input 148 from advance 146 will subsequently cause memory counter 228 to step one stage at a time, thus tracking the location of the error differential. If in a subsequent comparison, during the error correction interval, a positive error differential occurs during an odd time slot, which error differential is equal to or greater than that previously noted, the output of magnitude comparator 140 on path 142 and via gate 236 to memory counter 228 will reset memory counter 228 to 0001. Thus, the memory counter 152 will track the location of the maximum error differential as the associated decoded bit passes through the odd shift register 106. The memory counter 130 will similarly track the maximum error differential for the positive error which occurs in the even pulse train. Also, for memory counters 232 and 234, the negative error differentials are tracked. This tracking occurs because the inputs 148 and 150 from advance 146 cause the counters to advance at the odd and even half-rate clock rates. This is the same rate of advance as occurs in the sequential storage 50 for the odd and even pulse trains.

This stepping through the stages of the memory counting circuits in 152 is caused by the advance circuit 146 as shown in FIG. 15. Note that in order to track properly, the magnitude comparator 140 must reset the appropriate one of the counters in memory counter 152 to 0001 whenever an error differential is equal to or larger than the previous maximum, during the error correction interval. Referring to FIG. 15, advance 146 has an AND-gate 248 with one input 66 from the odd output of error detector 58 applied via inhibit connection. The other input to gate 248 is the odd extreme level via path 136. If an error occurs in the odd path, AND-gate 248 will not have an output. Thus, AND-gate 248 will have an output whenever an extreme level occurs in the odd pulse train so long as there is no error detected. OR-gate 252 has as one input the output of AND-gate 248 and as a second input the odd half-rate clock signal. OR-gate 252 will provide an output signal for each half-rate odd clock pulse as well as a pulse when AND-gate 248 provides an output. The output signal appears on path 148. A similar circuit is included for the even bits.

By resetting the memory counter 152 for an error differential which is greater or equal to one previously included in the magnitude comparator 140, the position of this maximum error differential is always available. Thus, at the time an error occurs, the memory counter 152 contains the time slot location for the maximum positive and negative differentials for both the odd and even pulse trains. The error detector 58 determines if the error occurred in the odd or even pulse train and applies this information to bit corrector 74. The extreme level odd or even is also applied to the bit corrector 74. This information is coupled in a logic circuit with the bit position information from the memory counter 152 so as to determine the error in the error correction interval to be corrected.

It is to be understood that there would be 15 output leads from each counter in memory counter 152, the odd appearing on paths 70 and even on paths 72, as shown in FIGS. 11 and 14. For each stage of the odd shift register 106 and of the even shift register 108 there is a connection from the bit corrector 74 (see FIG. 16 which shows one unit thereof). the particular unit shown in FIG. 16 is applicable only to the first stage $A_1$ of the odd shift register 106 as shown in FIG. 8. When an output pulse appears at lead 76A1, the bit in the odd shift register 106 in the first stage is complemented. Thus, if the bit that had appeared there was a 1, it would be changed to a 0 and vice versa. While 30 bit corrector units, such as are shown in FIG. 16, are required, only the operation of 1 will be described since this will clearly show how the other units must be connected to correct operation. Note that gates 256 and 258 are AND-gates and, because the discussion is concerned only with the odd pulse train, for example, the odd clock is applied as one input to both of these gates and the odd error detector output on path 66 is likewise applied as one input to both of these AND-gates. The polarity outputs, i.e., 70A1 and 70B1, are both present, but are applied to different AND-gates. If it is assumed that the maximum error differential appears in time slot 1 of the odd pulse train and that the error differential is positive, gate 256 will have an output pulse which passes through OR-gate 260 to path 76A1 and the input to the first bit position or register 106. The effect of this pulse is to complement the bit which appears in that location of the odd shift register 106.

As may be seen from the interaction of the various elements which make up the error corrector, timing is important. While certain delays have been shown, it is to be understood that others may be required to ensure proper operation, and that this is well known to those skilled in the art. As a summary, the sequence of events which follows for different conditions is as follows:

TABLE II

| Time Sequence For Three Conditions At 1.5 MHz Clock Rate | | |
|---|---|---|
| Extreme Level and Error Detected | Extreme Level and No Error Detected | Center Level |
| Advance Counter | Advance Counter | Advance Counter |
| Error detected | No error detected | — |
| — | Reset storage | — |
| Read in error differential | Read in error differential | Read in error differential |
| Compare error differential with maximum stored | Compare error differential with maximum stored | Compare error differential with maximum stored |
| Correct error | — | — |
| Reset Memory Counter | Reset Memory Counter | — |
| Reset Magnitude Comparator | — | — |
| — | Advance Counter | — |
| Here cycle ends on this bit and a new cycle starts on next bit. | Here cycle ends on this bit and starts on the same bit. | Here we are in the middle of a cycle. |

While the invention has been particularly shown and described with reference to preferred embodiments thereof, it will be understood by those skilled in the art that changes in form and detail may be made therein without departing from the spirit and scope of the invention.

What is claimed is:

1. Apparatus for correcting single errors in digital transmission systems employing a modified duobinary code signal comprising:

conversion means having at an input the modified duobinary code signal, said conversion means providing at a first output a binary representation of the input code signal and at a second output the error differential for each bit;

error detection means having an input connected to receive the modified duobinary code, said detection means providing an error output indication at a first output and providing top extreme level and bottom extreme level indications at second and third outputs, respectively, successive extreme level occurrences establishing an error correction interval;

sequential storage means having an input connected to the first output of said conversion means, said storage means temporarily storing a limiting number of bits, said limited number being sufficiently large so as to encompass all expected error correction intervals;

error analyzing means for determining which bit in an error correction interval is most likely to be in error, said error analyzing means having as a first input the second output of said conversion means and having second and third inputs, respectively, connected to the second and third outputs of said error detection means, and having an output; and means responsive to the output from said error detection means and to the output from said error analyzing means for complementing the bit in said sequential storage having the most likelihood of error for the error correction interval for which an error is detected.

2. Apparatus in accordance with claim 1 wherein said conversion means further comprises:

decoding means having an output and having an input connected to receive the modified duobinary code signal, said decoding means providing a binary signal at said output;

timing means providing a sampling frequency at the bit rate;

sample and hold means having an output and having a first input connected to receive the modified duobinary code signal, having a second input connected to said timing means, said sample and hold means holding a timed sample of said modified duobinary code signal for comparison with standard amplitude; and comparing means having an output, having a first input connected to the output of said sample and hold means, having second and third inputs connected, respectively, to the second and third outputs of said error detection means, and having a fourth input connected to said timing means, said comparing means providing error differentials at said output.

3. Apparatus in accordance with claim 2 wherein said error detection means further comprises:

slicing means having an input connected to receive the modified duobinary code signal and providing a pulse at a first output for an extreme top level and a pulse at a second output for an extreme bottom level;

an Exclusive OR-gate having two inputs and an output with one input being connected to the output of said decoding means;

first and second flip-flops connected in series from the output of said Exclusive OR-gate and means for connecting the output of said second flip-flop to the outer input of said Exclusive OR-gate; and coincident gating means having an output, having first and second inputs connected, respectively, to the first and second output of said slicing means, having a third input connected to the output of said second flip-flop, and having a fourth input connected to the output of said Exclusive OR-gate, said coincident gating means producing an error signal at the output when a present extreme level is the same binary state as the output of the second flip-flop, and the output of the Exclusive OR-gate is in the opposite binary state.

4. Apparatus in accordance with claim 3 wherein said error analyzing means further comprises:
- temporary holding means for temporarily storing the error differential for each bit, having an output, having a first input connected to the output of said comparing means and having a second input;
- magnitude comparator means for selecting the bit having the maximum error differential, having an output connected to the second input of said temporary holding means, having a first input connected to the output of said comparing means and having a second input;
- a first gating means having an input connected to the output of said temporary holding means, and having an output;
- a second gating means having an input and having an output connected to the second input of said magnitude comparator;
- maximum error differential storage means for storing the maximum error differential during an error correction interval, having an input connected to the output of said first gating means and having an output connected to the input of said second gating means, said maximum error differential being gated in from said temporary holding means when said magnitude comparator means determines the sample in said temporary holding means is equal to or greater than the maximum error differential in said storage means; and
- memory counting means for tracking the maximum error differential with a bit location in said sequential storage means, having a first input connected to said timing means to advance the counting means on each clock pulse, a second input connected to the output of said magnitude comparator to reset the counter to "1" when a maximum error differential is read into the maximum error differential storage means, third and fourth inputs connected to the second and third outputs of said error detection means to reset the counter to "0" following an extreme level occurrence and having a plurality of outputs equal in number to the limited number.

5. Apparatus for correcting single errors in digital transmission systems employing the modified duobinary code signal which comprises:
- means for decoding the modified duobinary code signal to obtain a binary equivalent thereof;
- means for separating alternate bits of the decoded modified duobinary code signal into two pulse trains, a first pulse train comprising the odd-numbered bits and a second pulse train comprising the even-numbered bits;
- means for sequentially storing a number of the odd-numbered bits and of the even-numbered bits;
- means for determining an occurrence of a top level or a bottom level bit of the modified duobinary code signal and providing output indications thereof;
- means for detecting errors in said modified duobinary code signal, said detecting means being responsive to the top level an bottom level determining means, and providing an output indicating if the error occurred in the first or second pulse train;
- means for obtaining the error differential for each bit, and providing an output representative of said error differential;
- means for analyzing the error likelihood for each bit in the first and in the second pulse train and tracking the bit that is the most likely error candidate for each pulse train during an error correction interval; and
- bit correcting means responsive to the error detecting means and to the analyzing means for complementing the bit in said sequential storage means that is the most likely error candidate following an error occurrence.

6. Apparatus for correcting single errors in digital transmission systems employing the modified duobinary code signal which comprises:
- means for determining occurrences of top levels and bottom levels of said modified duobinary code signal and providing output indications thereof;
- means for establishing successive error correction intervals, said means being responsive to the top level and bottom level output indications;
- means for separating alternate bits in the modified duobinary code into two pulse trains, a first pulse train comprising the odd-numbered bits and a second pulse train comprising the even-numbered bits;
- means for sequentially shifting and thus temporarily storing a limited number of bits from the first pulse train and of the second pulse train, said limited number being sufficiently large so as to encompass all expected error correction intervals;
- means for detecting errors in said modified duobinary code signal, said detecting means being responsive to the top and bottom level determining means and providing an output indicating if the error occurred in the first or second pulse train;
- means for obtaining the error differential for each bit and providing an output representative of said error differential;
- means for analyzing the error likelihood for each bit in both the first and second pulse trains and tracking the bit in said temporary storing means having the most likelihood of error for each pulse train during an error correction interval; and
- bit correcting means responsive to the error detecting means and to the analyzing means for complementing the bit in said temporary storing means that is the most likely error candidate following an error occurrence.

7. Apparatus in accordance with claim 6 wherein said separating means further comprises:
- timing means having a first clock output at the bit rate of the modified duobinary code, having a second clock output at one-half the rate of said first clock output and having a first phase, and having a third clock output at a bit rate of one-half the first clock output and having a phase which is opposite that of said second clock output;
- conversion means having an input connected to receive said modified duobinary code signal and providing an amplitude representation as a binary code word at its output;
- logic means having inputs connected to receive the most significant bits of said binary code, said logic means converting each binary code word into a binary representation of the duobinary signal at one output and providing top level and bottom level indications at other outputs;
- a first gating means having as one input the binary representation from said logic means and having as a second input the second clock signal, thus providing a binary output for alternate bits of the binary representation; and a second gating means having as one input the binary representation from said logic means and having as a second input the third clock signal, thus providing a second binary pulse train which includes the alternate bits not included in the first binary pulse train.

8. Apparatus in accordance with claim 7 wherein said means for sequentially shifting further comprises:

a first shift register having as one input the first pulse train, having as a second input the second clock signal whereby the bits read into the register are sequentially shifted therethrough, and having an input to each stage of the first shift register for error correction purposes; and a second shift register having as one input the second pulse train, having as a second input the third clock signal whereby the bits read into the register are sequentially shifted therethrough, and having an input to each stage of the second shift register for error correction purposes.

9. Apparatus in accordance with claim 8 wherein said means for detecting the errors further comprises:

a first error detecting circuit comprising a first delay circut having as a first input the top level output, having as a second input the bottom level output and having as a third input the second clock signal, said error detecting circuit providing first and second complementary outputs; third gating means having as one input the top level output, having as a second input the bottom level output, and having as third and fourth inputs the complementary outputs from said delay means, said third gating means having an output, and a first flip-flop having one input connected to the output of said gating means, having a second input connected to said second clock means, said first flip-flop providing an output when the successive extreme levels of the first pulse train are of one like state;

a second error detecting circuit comprising a second delay circuit having as a first input the top level output, having as a second input the bottom level output and having as a third input the clock signal, said second delay circuit providing complementary output signals; fourth gating means having as one input the top level output having as a second input the bottom level output and having as the third and fourth inputs the complementary outputs from said second delay circuit, said fourth gating means having an output; and a second flip-flop circuit having one input connected to the output of said fourth gating means, having as a second input said third clock signal and providing an output error indication whenever successive extreme levels of the second pulse train are of the same like state.

10. Apparatus in accordance with claim 9 wherein said means for establishing successive error correction intervals further comprises:

combining means having a first input connected to receive said top level, having a second input connected to receive said bottom level and providing the combined top and bottom levels at an output;

a fifth gating means having as one input the output of said combining means, having as a second input the second clock signal, and having an output whereby extreme level signals are obtained for the alternate bits of the first pulse train;

a sixth gating means having as one input the output of said combining means, having as a second input the third clock signal, and having an output whereby the extreme levels are obtained for the alternate bits of the second pulse train;

a seventh gating means having as one input the output of said fifth gating means and having as a second input the output from said first error detecting means, said seventh gating means providing an output upon the occurrence of an extreme level in the absence of a detected error and providing a delayed output when an error occurs in the first pulse train; and eighth gating means as one input the output of said sixth gating means and having as a second input the output from said second error detecting circuit, said eighth gating means providing an output upon the occurrence of an extreme level in the absence of a detected error and providing a delayed output when an error occurs in the second pulse train.

11. Apparatus in accordance with claim 10 wherein said means for analyzing further comprises:

magnitude comparator means having as one input the error differential for each bit at the bit rate of the modified duobinary code, having as a second input the bottom level indication, having as a third input the top level indication, having as fourth, fifth and sixth inputs the output from the first, second and third clocks, respectively, said comparator separately comparing the error differential of each successive bit for the first and second pulse trains and storing the maximum positive and maximum negative error differential for both the first and second pulse trains during an error correction interval, the comparator providing first and second outputs whenever the error differential of the current bit is equal to or greater than the stored error differential, respectively, for the first and second pulse train;

advancing means having as a first input the error output of said first pulse train, having as a second input the error output of said second pulse train, having as a third input the extreme level for said first train, and having as a fourth input the extreme level indication for the second pulse train, having as a fifth input the second clock output and having as a sixth input the third clock output, said advancing means providing outputs on first and second output paths at said second and third clock rates during an error correction interval; and memory counting means having as first and second inputs the outputs from said magnitude comparator, having as third and fourth inputs the outputs from said advancing means, having as fifth and sixth inputs the second and third clock signals, having as seventh and eighth inputs the bottom level and the top level indications, said memory counter tracking the bit location with respect to location in said sequential shifting means for the maximum error differential in both first and second pulse trains, said counter providing an output indication of the bit location having the most likelihood of error when an error has been detected.

12. Apparatus in accordance with claim 11 wherein said magnitude comparator means further comprises:

means for temporarily holding the error differential for each successive bit;

means for storing the maximum error differential;

means for comparing the successive error differentials with the maximum error differential so stored, said comparing means providing an output when the error differential for the successive bit is equal to or greater than the magnitude of the stored maximum error differential and for storing the maximum error differential for succeeding comparisons.

13. Apparatus according to claim 12 wherein said memory counter further comprises:

counting means having a reset to one input connected to the output of said magnitude comparator means, having a second input connected to the output of said extreme level means, having a third input connected to the output of said advancing means, said counting means providing an output for each counting stage, one said stage for each stage of said sequential shifting means.

14. Apparatus in accordance with claim 11 wherein said magnitude comparator means further comprises:

means for comparing positive error differentials comprising:

first means for temporarily holding successive positive error differentials;

second means for storing the maximum positive error differential for both first and second pulse trains; and third means for comparing successive positive error differentials with the maximum error differentials so stored, said comparing means providing an output when the error differential for a successive bit is equal to or greater than the magnitude of the stored maximum error differential, and for storing this as the new maximum error differential in said storing means; and means for comparing negative error differentials comprising:

fourth means for temporarily holding successive negative error differentials;

fifth means for storing the maximum negative error differential for both first and second pulse trains;

sixth means for comparing successive negative error differentials with the maximum error differentials so stored, said comparing means providing an output when the error differential for a successive bit is equal to or greater than the magnitude of the stored maximum error differential, and for storing this as the new maximum error differential in said storing means.

15. Apparatus in accordance with claim 14 wherein said memory counter further comprises:

a ninth gating means having as a first input the output of said third means, having as a second input the output of said sixth means, having as a third input the second clock output and having as a fourth input the third clock output; said ninth gating providing a signal at a first output for coincident signals on the first and third inputs, a signal at a second output for coincident input signals on said first and fourth inputs, a signal at a third output for coincident input signals on said second and third inputs, and a signal on a fourth output for coincident input signals on said second and fourth inputs;

a first counting means having the reset to one input connected to said first output of said ninth gating means, having a reset-to-zero input connected to the output of said fifth gating means, and having the stepping input connected to the first output path of the advance means, said first counting means providing a separate output for each counter stage;

a second counting means having the reset to one input connected to the second output of said ninth gating means, having the reset-to-zero input connected to the output of said sixth gating means, and having the stepping input connected to the output of the second output path of the advance means, said second counting means providing a separate output for each counter stage;

a third counting means having the reset to one input connected to the third output of said ninth gating means, having the reset-to-zero input connected to the output of said fifth gating means, and having the stepping input connected to the first output path of said advance means, said third counting means providing a separate output for each counter stage; and a fourth counting means having the reset to one input connected to the fourth output of said ninth gating means, having the reset-to-zero input connected to the output of said sixth gating means, and having the stepping input connected to the output of the second output path of the advance means, said fourth counting means providing a separate output for each counter stage.

16. Apparatus in accordance with claim 13 wherein said advance means further comprises:

a first delay means having its input connected to the output of said fifth gating means and having an output;

a tenth gating means having as one input the output from said first delay means, having as a second input the output from the first error detector, said connection being through an inhibit gate, and having an output;

an eleventh gating means having as one input the output of said tenth gating means and having as a second input the second clock signal, said eleventh gating means providing an output whenever an input pulse appears on either input;

a second delay means having its input connected to the output of said sixth gating means, and having an output;

a twelfth gating means having a first input connected to the output of said second delay means and having as a second input the output of said second error detector, said second input being connected through an inhibit gate, and having an output; and a thirteenth gate having as one input the output of said twelfth gate and having as the second input the third clock signal, said thirteenth gate providing an output whenever a pulse appears at either input.

17. Apparatus in accordance with claim 16 wherein said means for complementing includes a logic arrangement for each stage of said first and second shift registers, each logic arrangement comprising:

a fourteenth gating means having as one input an output from said timing means, having as a second input an output from said error detecting means, having as a third input the output of said top level from said determining means, and having as a fourth input an output from said memory counter, and having an output;

a fifteenth gating means having as one input an output from said timing means, having as a second input an output from said error detecting means, having as a third input an output of said bottom level from said determining means, and having as a fourth input an output from memory counter, and having an output; and a sixteenth gating means having as one input the output of said fourteenth gating means, having as a second input the output of said fifteenth gating means and having an output.

18. Apparatus for correcting single errors in digital transmission systems employing the modified duobinary code signal which comprises:

timing means having a first clock ouput at the bit rate of the duobinary code, having a second clock output of a first phase which is at half the rate of said first clock, and having a third clock output also at one-half the rate of said first clock, but having a phase which is the opposite of said second clock;

conversion means having as one input the modified duobinary code signal and having first, second and third clock inputs from said timing means, said conversion means providing at a first output a first pulse train which is a binary representation of the bipolar signal appearing in one alternate time slot of the modified duobinary code, at a second output a second pulse train which is a binary representation of the bipolar signal appearing in the other alternate time slot of the modified duobinary code, a third output representing the top level of the modified duobinary code, a fourth output representing the bottom level of the modified duobinary code, and a fifth output representing the error differential;

means responsive to the third and fourth outputs of said conversion means for establishing successive error correction intervals;

means for sequentially shifting, and thus temporarily storing, a limited number of the digits, separately, for the first and second pulse trains, said limited number being sufficiently large so as to encompass all expected error correction intervals;

means for detecting errors in said modified duobinary code signal, said detecting means being responsive to the third and fourth outputs of said conversion means, said detecting means providing a separate output indication for an error occurring in the first pulse train from the indication of an error occurring in the second pulse train;

means for analyzing the error likelihood for each bit in both the first and second pulse trains and for tracking the bit having the most likelihood of error for each pulse train during the error correction interval; and means responsive to the error detecting means and to the analyzing means for complementing the most likely error candidate upon an error occurrence.

* * * * *